UNITED STATES PATENT OFFICE.

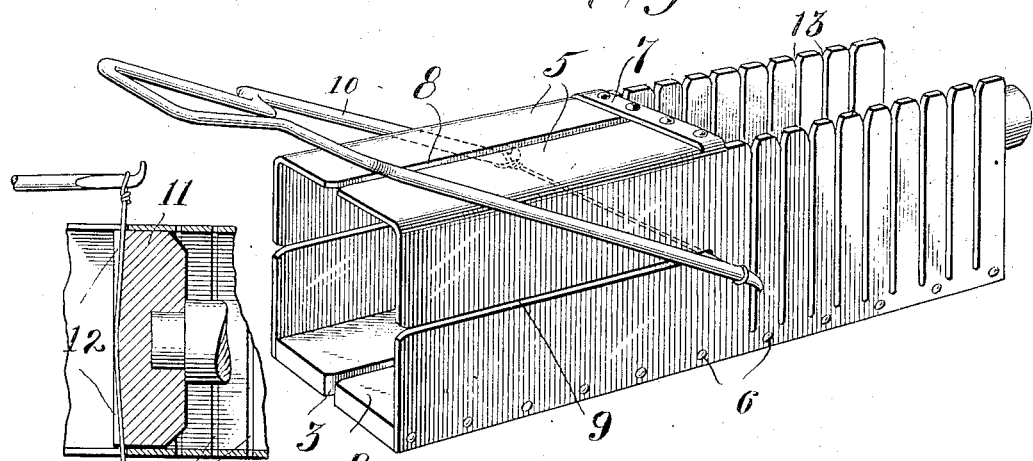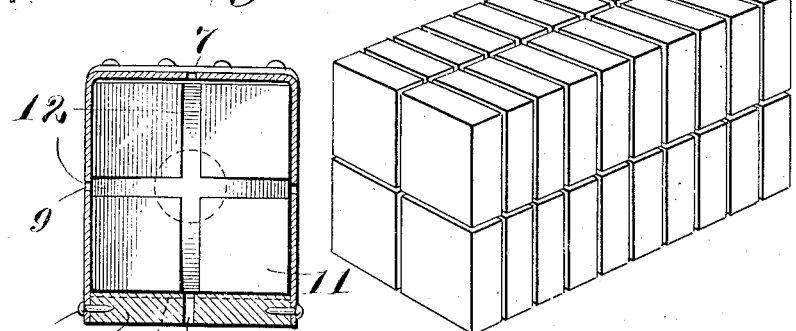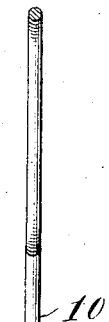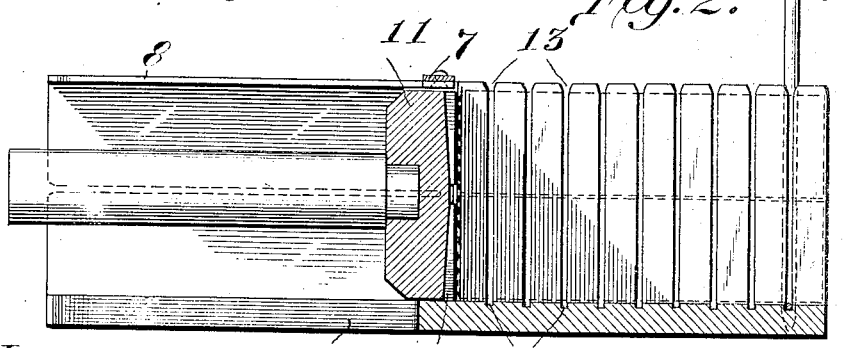

RICHARD F. STEWART, OF POCANTICO HILLS, NEW YORK.

BUTTER-CUTTER.

No. 865,447.  Specification of Letters Patent.  Patented Sept. 10, 1907.

Application filed February 12, 1907. Serial No. 356,986.

*To all whom it may concern:*

Be it known that I, RICHARD F. STEWART, a citizen of the United States, residing at Pocantico Hills, in the county of Westchester and State of New York, have invented new and useful Improvements in Butter-Cutters, of which the following is a specification.

The present invention relates to devices for cutting up masses of soft, easily divided substances, and has for its object the provision of a cheap, readily manipulable instrumentality which may serve the purpose of the individual user who may wish to sub-divide a block of substance into smaller portions of uniform and symmetrical shape.

More particularly is the device intended for use in cutting up blocks or prints of butter into individual pats, and it is in connection with this use of the device that I shall explain my invention, although this application, it will be understood, is merely for illustrative purposes and I do not limit the use of my invention to the particular adaptation of it herein shown and described.

In cutting up prints or blocks of butter into individual pats for serving, it is desirable that the work be cleanly and expeditiously performed, eliminating so far as possible the necessity of handling the product, and it is with the object of providing a device possessing the characteristics mentioned that I have devised the present instrumentality. It is desirable, furthermore, that the device shall be of such character that it may be readily cleaned, and preferably its construction should be such that after the block or mass of butter has been placed therein, it may either be immediately severed into the individual pats as a whole, or it may be left in the cutter so that if it be not necessary to separate the entire block into the individual pats, there may be cut therefrom such portions as are needed for immediate use.

In order that the invention may be understood by those skilled in the art, to whom this disclosure is addressed, I have shown in the accompanying drawing one embodiment of my invention, and since it is obvious that this showing is merely illustrative of one physical expression of my invention, I do not wish to be understood as limiting myself to the exact details shown in the drawing and hereinafter described, as I regard all obvious mechanical variations and equivalent expedients for the construction here disclosed as within the purview of my invention, except, of course, in so far as I am limited by the prior art to which my invention belongs.

In said drawings, Figure 1 is a perspective view of a butter cutting device made in accordance with my invention. Fig. 2 is a longitudinal sectional view of the device shown in Fig. 1. Fig. 3 is a detail sectional view taken at right-angles to the sectional view in Fig. 2 to illustrate one of the cutting operations. Fig. 4 is a transverse section to show the block sustaining plunger. Fig. 5 is a perspective of a mass of material divided by means of my cutter.

Referring now to the drawings by numerals, like numbers indicating like parts in the several views, 2 indicates the base-board or bottom of the cutter, which, in the embodiment of the invention herein shown, is made of wood, preferably some non-odorous and tasteless wood to guard against contamination of the material being cut, this bottom 2 being longitudinally slotted as at 3 for about half its length (see Fig. 2); the remaining portion of the bottom 2 being provided on its upper face with a series of sawcuts or kerfs for a purpose which will presently appear.

While I have shown and described bottom 2 as being made of wood in the present embodiment of my invention, this being desirable for the reason that it furnishes a strong rigid base upon which to mount the other parts of the cutting box, yet it will be understood that this bottom might be made of metal the same as the sides and top of the box if this should be found to be desirable. Mounted upon this base-board 2 or bottom, is the box portion of the cutter which is preferably formed for convenience in manufacture of two similar shaped metal pieces 5, which form the sides and top of the cutting box, these box portions being secured in any suitable manner, as by nails or other fastening devices 6 to the base-board 2, the top webs of these box portions which, as will be seen, cover and inclose substantially one-half the cutting box, being tied together by means of a transverse strip 7, which is riveted in place as shown.

Preferably the side members are formed of metal, and I prefer to use aluminium as the material, for the reason that this metal does not rust or corrode, and may be easily kept clean and sweet, so that all danger of fouling or contaminating the products is eliminated.

It will be observed that the covering portions of the box members 5 are slightly separated as at 8 so as to form a slot which is in line with and opposed to the slot 3 in the bottom 2 of the box. The sides of the box are likewise slotted as shown at 9 so that the inclosed end of the cutting box, as will be seen, is provided with coincident slots, the planes of which are at right angles to each other, the entering mouths of these slits being preferably beveled outwardly to facilitate entrance of the cutting tool which will be hereinafter referred to.

The inclosed portion of the cutting box in the embodiment of the invention herein shown, is of a size to receive a one pound block or print of butter, although it will be obvious that the matter of dimensions may be varied to suit the needs of the user.

Assuming that a print of butter has been inserted in the inclosed end of the box, the first step will be to sever that print into four rectangular blocks of equal size, this cutting being accomplished by means of the tool 10, which consists of the spring bow having stretched across its fork a cutting wire, which wire, when drawn through the slots 8 and 9 will cut the block or print into four equal parts on the lines indicated in Fig. 5. In order to hold the print in position during this longitudinal cutting and prevent its being shifted or slid through the box, I provide the head or abutment 11 provided with a handle, by means of which the operator may hold it in the position shown in Fig. 1, against the end of the print. To insure a complete severance of the block, this holding head is provided with grooves 12 placed at right angles to each other as shown in Fig. 4, these grooves 12 being preferably of greater depth at their ends so that when the cutting wire strikes this head 11, it will strike the center first, and then yielding, will take the flexed position shown in Fig. 3, so as to cut clear through the block of butter. After the longitudinal cuts along the slots in the inclosed portion of the cutting box have been made, the operator, reversing the position of the head 11 so that it will take the position shown in Fig. 2, will force the four blocks into which the print has been cut through to the open-topped portion of the cutting box. The sides of this end of the box are slotted as at 13 with any desired number of slots, dependent on the size and number of the pats desired, which slots 13 are opposed, and coincide with the kerfs 4 in the base-board 2 hereinbefore referred to, the slots 13 being beveled out at the upper ends as shown, to permit the ready entrance of cutting wire of the tool 10. When the four longitudinal blocks into which the print has been divided, are brought to position in the open-topped portion of the cutting box, the cutter 10 will be forced down through the slots 13, and the four blocks will be severed along the line of the slots into individual pats of the character shown in Fig. 5, the cutting wire of the tool 10 dropping into the kerfs 4 so as to insure the complete severance of the four blocks into individual pats. It will be obvious that this box may be used either to cut up the print into pats as a whole, or that it may be used to cut up the blocks into pats as they are needed for use, the device being of such dimensions that it may readily be placed in the refrigerator after the print has once been put in place for cutting up and may be kept until such time as another portion is needed.

The device is so simple in construction that it may be kept clean with small exertion, it being necessary only to dip the same in hot water to thoroughly cleanse it, and it will be obvious that prints may be cut up without any waste whatever. The construction is such, moreover, that only one cutting tool or wire is needed, and this I consider of considerable value, for the reason that in some cutters with which I am familiar and in which a multiplicity of fixed cutting wires are employed, some difficulty has been experienced because of the trouble that arises from breakage of wires; and, furthermore, where the butter is forced past the cutting instrumentality in contra-distinction to forcing the cutting instrumentality through the butter, this pressure against the block has a tendency to again mold together and stick the blocks or individual pats into which the mass is divided.

Having disclosed my invention, I claim:—

1. In a device of the class described, a cutter box, one portion of which is provided with longitudinal cutter-receiving slots, the other portion of said box having transverse cutter-receiving slots.

2. In a device of the class described, a cutter box, one portion of which is provided with longitudinal cutter-receiving slots arranged in planes at an angle to each other, the other portion of said box having a plurality of transverse cutter-receiving slots lying in planes at right angles to said longitudinal slots.

3. In a device of the class described, a cutter box having an inclosed portion provided with longitudinal cutter-receiving slots arranged in planes at right angles to each other, and an open-topped portion the side walls of which are provided with transverse cutter-receiving slots.

4. In a device of the class described and in combination, a cutter box slotted longitudinally through a portion of its length and having transverse slots in the walls of its remaining portion, a cutter-receiving abutment having cutter-receiving grooves in its face, and a cutting tool adapted to traverse the longitudinal and transverse slots.

5. In a device of the class described and in combination, a cutter box having longitudinal slots throughout a portion of its length and transverse slots in the walls of the remaining portion, a cutter-receiving abutment having cutter-receiving grooves therein of gradually increasing depth toward their ends, and a cutting tool adapted to traverse the slots in said cutting box.

6. In a device of the class described and in combination, a cutter box having cutter-receiving slots traversing its walls, a cutter-receiving abutment having a groove in the face thereof to receive the cutting tool, and a cutting tool adapted to traverse said cutter-receiving slots and enter said grooved abutment.

7. In a device of the class described and in combination, a cutter box having cutter-receiving slots, an abutment having a cutter-receiving groove of unequal depth, and a cutting tool adapted to traverse said slots and enter said grooved abutment.

8. In a device of the class described and in combination, a cutter box having cutter-receiving slots, an abutment having a groove which gradually increases in depth from its center to its ends, and a cutting tool adapted to traverse said slots and enter said grooved abutment.

9. In a device of the class described and in combination, an open ended cutter box inclosed on its four longitudinal sides for substantially half its length, and having longitudinal slots in the walls of said inclosed portion, the planes of which are substantially at right angles to each other, said box throughout the remainder of its length being open at its top and having its side walls provided with a plurality of coincident slots, and a cutting tool adapted to traverse the said longitudinal and transverse slots.

10. In a device of the class described, a base-board slotted longitudinally through a portion of its length and kerfed transversely of its other portion, and inclosing walls carried by said base-board and provided with longitudinal slots and transverse slots coöperating with said slotted and kerfed base-board, respectively.

In testimony whereof I have hereunto set my hand in presence of two subscribing witnesses.

RICHARD F. STEWART.

Witnesses:
WILLIAM A. PRATT,
KATHERINE C. GLANVILLE.